United States Patent
Stafford et al.

(10) Patent No.: US 10,129,190 B2
(45) Date of Patent: *Nov. 13, 2018

(54) METHOD AND APPARATUS FOR MESSAGING SERVICE INTERNETWORKING

(71) Applicant: AT&T Mobility II LLC, Atlanta, GA (US)

(72) Inventors: Matthew Stafford, Austin, TX (US);
Vinod Pandey, Eden Prairie, MN (US);
William Rosenberg, Austin, TX (US);
Jerry Shih, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1023 days.

This patent is subject to a terminal disclaimer.

(21) Appl. No.: 14/052,010

(22) Filed: Oct. 11, 2013

(65) Prior Publication Data
US 2014/0040405 A1    Feb. 6, 2014

Related U.S. Application Data

(63) Continuation of application No. 12/873,837, filed on Sep. 1, 2010, now Pat. No. 8,583,748.

(51) Int. Cl.
*H04L 12/58* (2006.01)
*H04L 29/06* (2006.01)
*H04W 4/18* (2009.01)
*G06F 9/54* (2006.01)

(52) U.S. Cl.
CPC .............. *H04L 51/10* (2013.01); *G06F 9/541* (2013.01); *H04L 51/06* (2013.01); *H04L 69/08* (2013.01); *H04W 4/18* (2013.01)

(58) Field of Classification Search
CPC ... H04L 51/066; H04L 12/5835; H04L 69/08; H04L 65/1016; H04L 51/38; H04W 4/12; H04W 4/14; H04W 4/18; G06F 9/541
See application file for complete search history.

(56) References Cited

U.S. PATENT DOCUMENTS

| | | | |
|---|---|---|---|
| 4,754,479 A | 6/1988 | Bicknell et al. | |
| 5,524,137 A * | 6/1996 | Rhee | H04M 3/5307 348/E7.081 |
| 6,754,484 B1 * | 6/2004 | Hiltunen | H04W 28/14 455/412.1 |
| 6,760,343 B1 | 7/2004 | Krishnamurthy et al. | |
| 6,912,564 B1 * | 6/2005 | Appelman | H04L 51/04 709/204 |

(Continued)

*Primary Examiner* — Ramy M Osman
(74) *Attorney, Agent, or Firm* — Chiesa Shahinian & Giantomasi PC

(57) ABSTRACT

A method and system for converting data message formats in a message server is provided. The message server receives a first data message including origin format information from a first user. The message server then sends the first data message including origin format information to a second user. The message server receives a second data message from a second user, the second data message including the origin format. The second data message is converted to the origin format if the first user is unable to receive the second data message. The message server then sends the converted second data message to the first user.

17 Claims, 6 Drawing Sheets

(56) References Cited

U.S. PATENT DOCUMENTS

| | | | |
|---|---|---|---|
| 6,957,077 B2* | 10/2005 | Dehlin | H04L 51/38 455/412.2 |
| 7,003,283 B2* | 2/2006 | Hiltunen | H04W 28/14 455/412.1 |
| 7,274,926 B1* | 9/2007 | Laumen | H04L 12/5825 370/349 |
| 7,356,001 B1 | 4/2008 | Jones et al. | |
| 7,792,981 B2 | 9/2010 | Taylor | |
| 9,515,972 B2* | 12/2016 | Shen | H04L 51/066 |
| 2002/0141368 A1 | 10/2002 | Cheung et al. | |
| 2002/0169894 A1* | 11/2002 | Takla | H04L 69/08 709/250 |
| 2003/0040300 A1 | 2/2003 | Bodic et al. | |
| 2003/0193951 A1 | 10/2003 | Fenton et al. | |
| 2003/0212772 A1* | 11/2003 | Harris | H04L 41/12 709/220 |
| 2004/0015609 A1 | 1/2004 | Brown et al. | |
| 2004/0057403 A1 | 3/2004 | Jerbi et al. | |
| 2004/0162059 A1* | 8/2004 | Hiltunen | H04W 28/14 455/412.1 |
| 2004/0266411 A1* | 12/2004 | Galicia | H04M 3/5307 455/414.4 |
| 2005/0071434 A1 | 3/2005 | Hettish et al. | |
| 2005/0108332 A1 | 5/2005 | Vaschillo et al. | |
| 2005/0258938 A1* | 11/2005 | Moulson | H04M 1/575 340/7.58 |
| 2006/0041848 A1* | 2/2006 | Lira | H04L 51/04 715/805 |
| 2006/0053227 A1* | 3/2006 | Ye | H04L 12/5835 709/230 |
| 2006/0136607 A1* | 6/2006 | Shirano | G06F 11/1633 710/1 |
| 2006/0168049 A1* | 7/2006 | Orozco | H04L 51/04 709/206 |
| 2006/0193450 A1 | 8/2006 | Flynt et al. | |
| 2006/0200568 A1* | 9/2006 | Kim | H04L 51/066 709/227 |
| 2007/0133594 A1* | 6/2007 | Pazhyannur | H04L 12/583 370/465 |
| 2007/0184857 A1* | 8/2007 | Pollock | H04W 4/18 455/466 |
| 2007/0198742 A1* | 8/2007 | Pak | H04L 12/5835 709/246 |
| 2007/0243876 A1* | 10/2007 | Duan | H04L 65/1016 455/445 |
| 2008/0089509 A1 | 4/2008 | Wuthnow et al. | |
| 2008/0175157 A1* | 7/2008 | Lim | H04L 65/1016 370/242 |
| 2008/0240117 A1* | 10/2008 | Gavita | H04L 51/066 370/400 |
| 2009/0003381 A1 | 1/2009 | Shamilian et al. | |
| 2009/0086725 A1* | 4/2009 | Lai | H04W 4/12 370/352 |
| 2009/0129372 A1* | 5/2009 | Pandey | H04L 65/1016 370/352 |
| 2009/0138540 A1 | 5/2009 | Peng et al. | |
| 2009/0163231 A1* | 6/2009 | Yoo | H04L 51/38 455/466 |
| 2009/0197622 A1* | 8/2009 | Atarius | H04L 51/30 455/466 |
| 2009/0318174 A1* | 12/2009 | Tarleton | H04W 4/14 455/466 |
| 2010/0036919 A1 | 2/2010 | Masson et al. | |
| 2010/0056118 A1* | 3/2010 | Galicia | H04M 3/5307 455/414.4 |
| 2010/0167762 A1* | 7/2010 | Pandey | H04L 65/1006 455/466 |
| 2010/0289812 A1* | 11/2010 | Kobayashi | G09G 5/02 345/590 |
| 2011/0134843 A1* | 6/2011 | Noldus | H04L 65/1016 370/328 |
| 2011/0319075 A1* | 12/2011 | Sharma | H04W 4/14 455/432.2 |
| 2012/0157127 A1 | 6/2012 | Ferren et al. | |
| 2013/0110942 A1* | 5/2013 | Shen | H04L 51/066 709/206 |
| 2015/0032833 A1* | 1/2015 | Shen | H04L 51/066 709/206 |

* cited by examiner

METHOD AND APPARATUS FOR MESSAGING SERVICE INTERNETWORKING

This application is a continuation of U.S. patent application Ser. No. 12/873,837, filed Sep. 1, 2010, which is entirely incorporated herein by reference.

FIELD OF THE INVENTION

The present disclosure is generally directed to a method and apparatus for providing dynamic control over network behavior to facilitate internetworking between different messaging services and different message formats.

BACKGROUND

With the increased integration of communications technology and multimedia, a number of messaging systems, such as paging, instant messaging (IM), short message service (SMS) text messaging, and multimedia messaging service (MMS) messaging have emerged as the predominant formats used by communication devices for communicating messages. As multimedia messaging has grown in popularity, messaging services have improved rapidly in order to create a more rewarding end-user experience by allowing an end-user device the ability to choose and support multiple media formats. However, as improvements are made, users may not always be able to communicate with users using older messaging services.

SUMMARY

In accordance with an embodiment, a messaging server capable of converting data message formats of different messaging services is provided. The message server receives a data message including an origin format from a first user. The message server sends the data message to a second user. A second message sent from the second user is received by the message server including the origin format. The second data message may be converted to the origin format if the first user is unable to receive the second data message in its originally transmitted format. The converted second data message is then sent to the first user from the message server.

In accordance with a further embodiment, the origin formats may be contained in message headers within data messages or stored at the message server. The message server may modify the origin format. The origin format may also be selectively absent from the second data message if it is impossible for that data message to be converted to the origin format.

In accordance with yet a further embodiment, an end user device capable of converting data message formats of different messaging services is provided. A data message from a first user including an origin format is received through a message server. The end user device then sends a second data message to the first user including the origin format to a message server. The specific message server that the second data message is sent to may be defined by the end user device.

These and other advantages of the embodiments described will be apparent to those of ordinary skill in the art by reference to the following detailed description and the accompanying drawings.

DETAILED DESCRIPTION

The following description, including exemplary embodiments and corresponding Figures, are aimed at providing improvements to service-level interworking between IMS messaging and other types of messaging. Beneficial information that is generally lost or "forgotten" in a communication network is stored and used to facilitate a dynamic mode of messaging system integration. Specifically, the present disclosure proposes the addition of two message header fields: "Originated-As" and "OK-To-Convert-To" to achieve dynamic messaging system integration. The header field names "Originated-As" and "OK-To-Convert-To" are used for exemplary purposes. An actual implementation of the embodiments described in the present disclosure may use any header names or fields supported by existing and future communication network protocols. Specific benefits regarding the headers and how the headers are implemented shall be described and illustrated in greater detail below. Although this description provides examples for implementing the embodiments in systems using IMS messaging, the embodiments described below are not limited to IMS messaging. The embodiments described herein may be applied to a variety of messaging services, including, but not limited to, IMS, SMS, MMS, IM, voicemail, or email.

Figure 1:
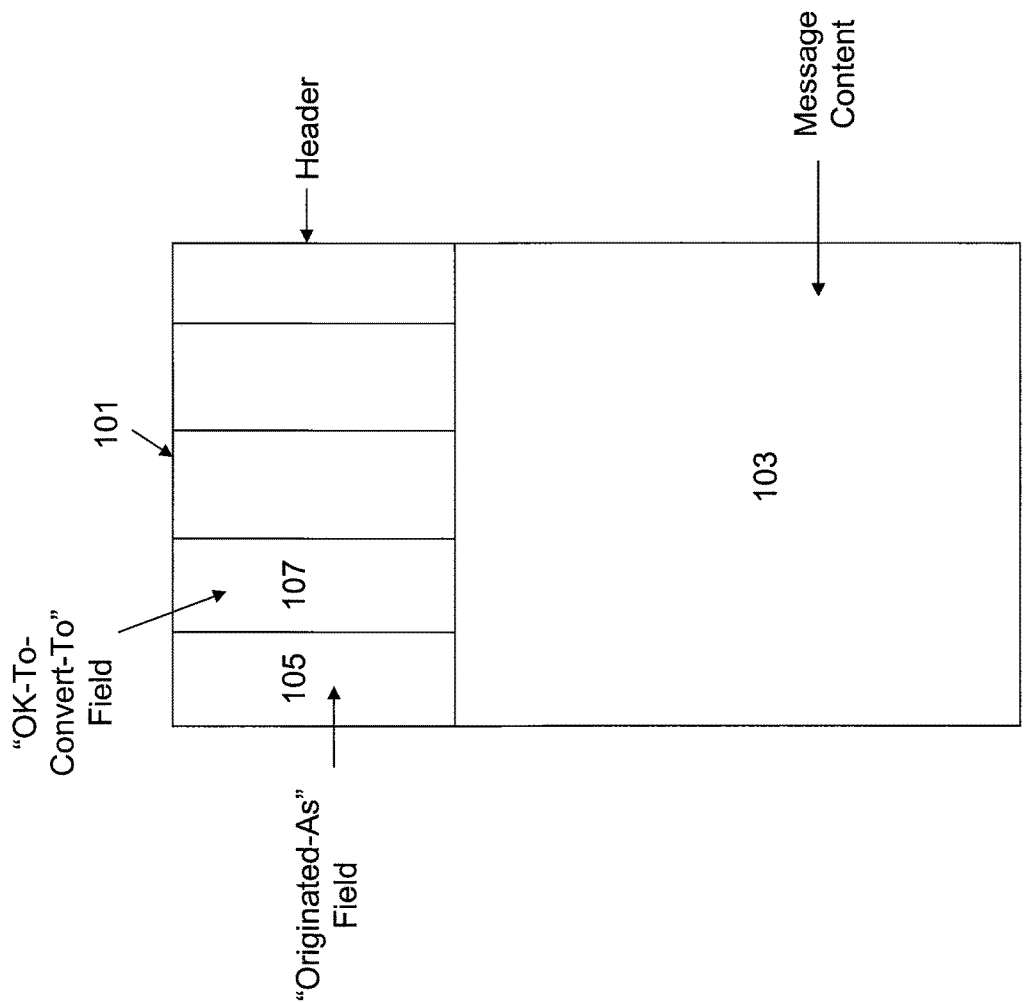
FIG. 1 shows a diagram of a data message with a header supporting the header fields described in accordance with an embodiment.

FIG. 1 shows an exemplary diagram of a data message 100 with a header supporting the "Originated-As" and "OK-To-Convert-To" header fields. The actual data message content is represented by message content block 103 and the header is represented by block 101. Header block 101 may include a plurality of header fields, as shown in FIG. 1. Both the "Originated-As" Field 105 and "OK-To-Convert-To" Field 107 are shown residing within header block 101 of data message 100. The "Originated-As" header field 105 provides an indication of the origin format of a data message sent from a first user to a second user via a message server or communication network. The "OK-To-Convert-To" header field 107 provides an indication of the origin format of the first user's data message and is generally appended to the data message from the second user to the first user to indicate to a message server or communication network that the message from the second user should be converted to the origin format. Both of the aforementioned header fields may be populated by an end user device, message server, or within a communication network. By using these fields, a message server or communication network is able to dynamically convert between different message formats to provide users the ability to seamlessly send data messages to one another.

Figure 2:
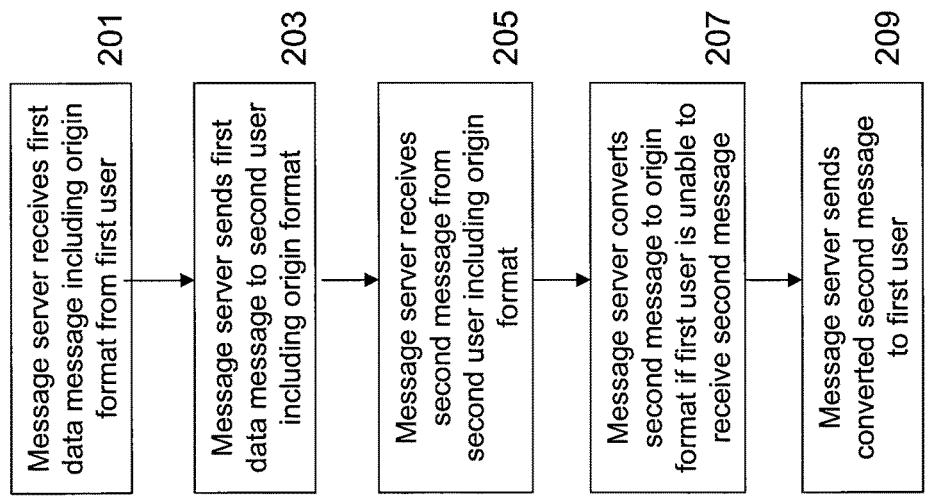
FIG. 2 is a flow chart of the steps performed by the message server in order to facilitate data message format conversion in accordance with an embodiment.

FIG. 2 is a flow chart of a process 200 in accordance with an embodiment of the present disclosure for dynamically converting data message formats. The process may be executed from a message server capable of converting message formats of different messaging services. In accordance with process 200, a message server receives a first message from a first user including information indicating the origin format of the first message, shown by step 201. In step 203 the message server sends the first message including a header with information indicating the origin format of the first message to a second user. Upon receipt of the first message, the second user may choose whether or not to respond to the first message. Should the second user decide to respond, in step 205, the message server receives a second message from the second user. The second message may include a header with information indicating that the second message may be converted to the origin format of the first message. In step 207, the message server may convert the second data message to the origin format based on whether or not the first user is able to receive the second data message in its present form. In step 209, the message server sends the converted second data message to the first user.

Figure 3:
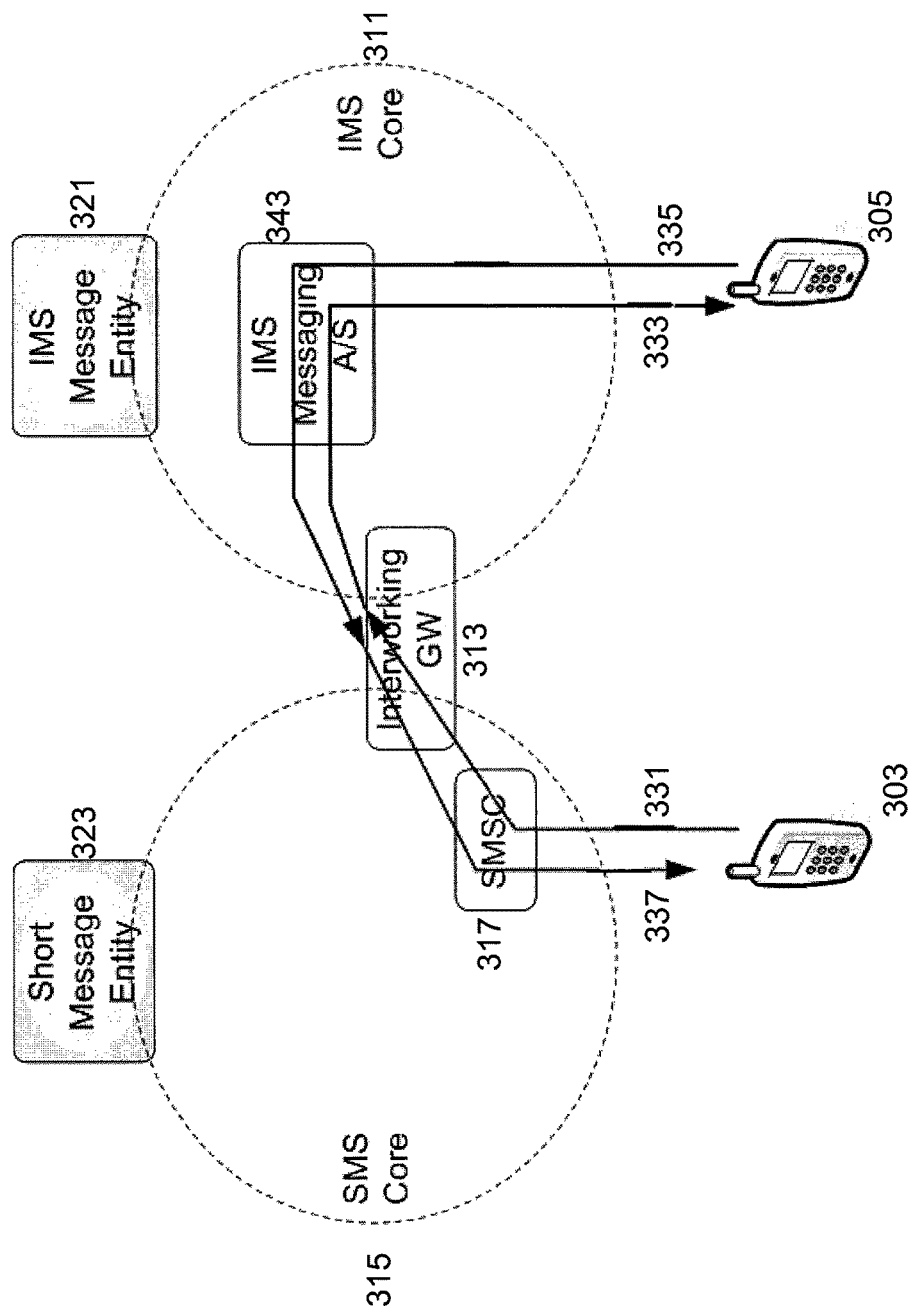
FIG. 3 shows a diagram of end user devices in communication with one another through a message server capable of dynamically converting data message formats in accordance with an embodiment.

The techniques described herein advantageously allow a message server to dynamically convert message formats for transmitting messages in different message formats between end user devices. In the absence of an "Originated-As" and "OK-To-Convert-To" field, a message server represented by interworking gateway (GW) 313 and end user device 305, as shown in FIG. 3, would not be aware that end user device 303 sent its initial message in an SMS format and that end user device 303 is currently only able to receive messages in an SMS format. Instead, end user device 305 would send a response in an IMS format, resulting in delivery of the message being delayed until end user device 303 once again attains IMS connectivity. The "Originated-As" and "OK-To-Convert-To" fields may also be used to form an intrinsic association at interworking GW 313 between the original message sent by end user device 303 and the response message sent by end user device 305 by storing the information from the "Originated-As" and "OK-To-Convert-To" header fields within interworking GW 313.

FIG. 3 shows an exemplary diagram of end user communication devices that communicate with one another through a network including a message server implementing the principles discussed in the present disclosure. In this particular example, interworking between SMS and IMS is shown. End user devices 303 and 305 are both IMS-enabled devices. End user device 305 has IMS connectivity, as shown by IMS Core 311. IMS Core 311 represents a portion of a communication network supporting IMS protocols and functionality. IMS Message Entity block 321 signifies that an entity capable of sending and receiving IP data messages resides in IMS Core 311. In the example shown, end user device 303 does not have IMS connectivity. For example, end user device 303 may be in the midst of a conference call and only in a 2.5G coverage zone which is unable to support IMS connectivity. End user device 303 may also be in a roaming network that cannot establish IMS connectivity.

Instead, end user device 303 has SMS connectivity, as shown by SMS Core 315. SMS Core 315 represents a portion of a communication network supporting SMS protocols and functionality. SMS Core 315 includes short message service center (SMSC) 317. SMSC 317 is a network element within SMS Core 315 that is responsible for routing SMS messages to their intended delivery targets. Short Message Entity block 323 signifies that an entity capable of sending and receiving SMS data messages resides in SMS Core 315.

End user device 303 may send a text message, represented by line 331 in FIG. 3, in an SMS message format to end user device 305 through SMSC 317, which then routes the message to interworking GW 313. For example, the text message may include the following content: "When should we meet?" interworking GW 313 acts as a bridge to manage the origination of and termination of SMS messages in an IP-based network. Interworking GW 313 then sends the message to a message server within IMS Core 311, represented by IMS Messaging Application Server (A/S) 343. In an embodiment of the present application, it is understood that interworking GW 313 and IMS Messaging A/S 343 may both reside within the same message server.

The message is converted to a native session initiation protocol (SIP) format by IMS Messaging A/S 343. IMS Messaging A/S 343 populates the header of the message with an "Originated-As:" field. The message, including header, may take the following form, with the last line comprising the message content:

MESSAGE sip:chet@att.net SIP/2.0
.
.
.
Originated-As: SMS
Content-Type: text/plain
Content-Length: 20
When should we meet?

The message shown above, represented by line 333 shown in FIG. 3, may then be delivered by IMS Messaging A/S 343 to end user device 305.

Should end user device 305 choose to respond, a response message is created in native SIP format: "How about 6:30 PM?" End user device 305 may populate the header with an "OK-To-Convert-To" field, where the value is set to 'SMS', indicating that interworking GW 313 should convert the response message to SMS unless end user device 303 attains IMS connectivity. The message, including header, may take the following form, with the last line comprising the message content:

MESSAGE tel: +15123725623 SIP/2.0
.
.
.
OK-To-Convert-To: SMS
Content-Type: text/plain
Content-Length: 18
How about 6:30 PM?

This message, represented by line 335 shown in FIG. 3, is then delivered from end user device 305 to interworking GW 313, through IMS Messaging A/S 343. At interworking GW 313, it is determined whether end user device 303 has attained IMS connectivity. If not, then the message, represented by line 337 shown in FIG. 3, is converted to SMS by interworking GW 313, and delivered to end user device 303 through SMSC 317: "How about 6:30 PM?"

Interworking GW 313, described above, converts incoming messages into a native SIP format instead of an encapsulated SIP format because it takes twice as many SIP messages to deliver and acknowledge an encapsulated SIP message as is required to deliver and acknowledge a message in native SIP format. Native SIP and encapsulated SIP are well known terms, as are the messaging standards required for delivering and acknowledging SIP messages. Thus, a detailed discussion on this topic is not provided in this disclosure.

Interworking GW 313 may also override the "OK-To-Convert-To" field with its own policies. For example, using the above described case, if end user device 303 cannot support SMS for some particular reason in addition to not having IMS connectivity, then interworking GW 313 may populate the "OK-To-Convert-To" field with a different messaging service to ensure that end user device 303 receives the message from end user device 305 in a timely fashion. Messaging server policies, such as those followed by Interworking GW 313, are usually set by a communication network provider but may also be set by an end user device.

Figure 4:
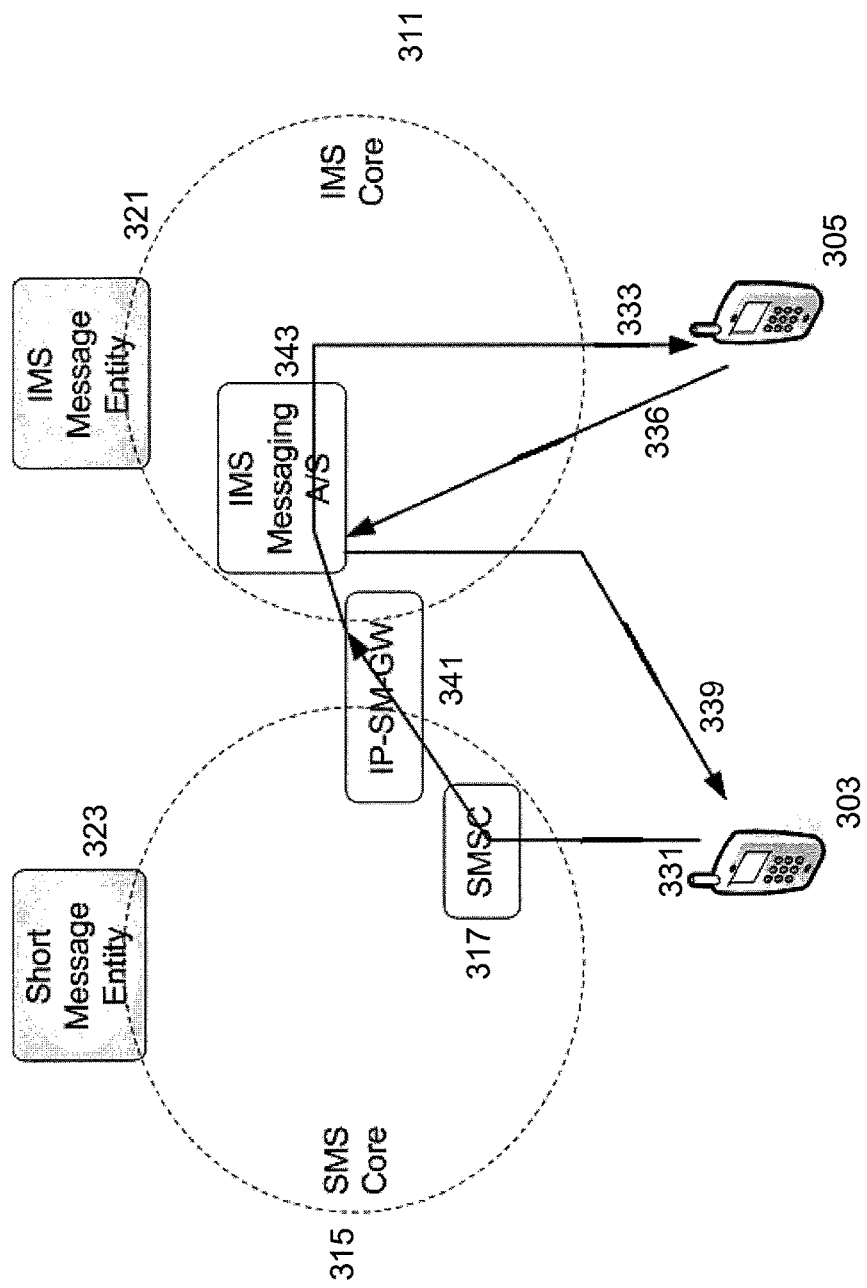
FIG. 4 shows another diagram of end user devices in communication with one another through a message server capable of dynamically converting data message formats in accordance with another embodiment.

FIG. 4 shows an exemplary diagram of end user communication devices communicating through a network including a message server implementing further principles discussed in the present disclosure. Most notably, FIG. 4 shows a situation where the message sent from end user device 305 to a message server cannot be converted to an origin format of end user device 303. Line 339 of FIG. 4 represents a message, sent by end user device 305, in a format that is unable to be converted to SMS, which happens to be the origin format of end user device 303. Thus, the message represented by line 339 is transmitted from IP Messaging A/S 343, and not IP Short Message Gateway (IP-SM-GW) 341, which acts as a message server similar to interworking GW 313 described above. This particular case will be discussed in further detail below.

In FIG. 4, end user device 303 sends a text message, represented by line 331 in FIG. 3, using an SMS message format to end user device 305 to SMSC 317 which routes the message to IP-SM-OW 341. The text message includes the following content: "When should we meet?"

The message is converted to a native session initiation protocol (SIP) format by IP-SM-OW 341. IP-SM-OW 341 then populates the header of the message with an "Originated-As:" field. The message may take the following form:

---
MESSAGE sip:chet@att.net SIP/2.0
.
.
.
Originated-As: SMS
Content-Type: text/plain
Content-Length: 21
Where should we meet?
---

The message shown above, represented by line 333 shown in FIG. 4, may then delivered through IMS Messaging A/S 343 to end user device 305.

At this point, the example has progressed similarly to the example discussed above corresponding to FIG. 3. However, instead of responding through text, end user device 305 decides to respond using a multimedia format consisting of a pointer to a map. The pointer to a map and corresponding map cannot be downloaded or accessed by end user device 303. The pointer itself may be a URL and deliverable over SMS; however, in a use case where end user device 303 does not have data connectivity, end user device 303 cannot download the data pointed to by the URL until data connectivity is restored. Thus, a conversion to SMS would not help to ensure that the message recipient is able to obtain the data that the sender ultimately wants him to see (which is the map in this example). Therefore, the client on end user device 305 refrains from including the "OK-To-Convert-To" field. As a result, the "OK-To-Convert-To" field which would have contained the origin format is absent from the message because the message including a pointer to a map cannot be converted to the origin format. As a result, end user device 305 transmits the message, represented by line 336 shown in FIG. 4, in a multimedia format to IMS Messaging A/S 343.

IMS Messaging A/S 343 stores the message until end user device 303 attains IMS connectivity because IMS connectivity is capable of supporting multimedia message formats. Thus, when IMS connectivity is restored for end user device 303, IMS Messaging A/S 343 delivers the multimedia message, represented by line 339 of FIG. 4, consisting of a pointer to a map to end user device 303.

This example illustrates the ability and usefulness of the "OK-To-Convert-To" header field in differentiating preferred behavior based upon which messaging service format is being used.

Figure 5:
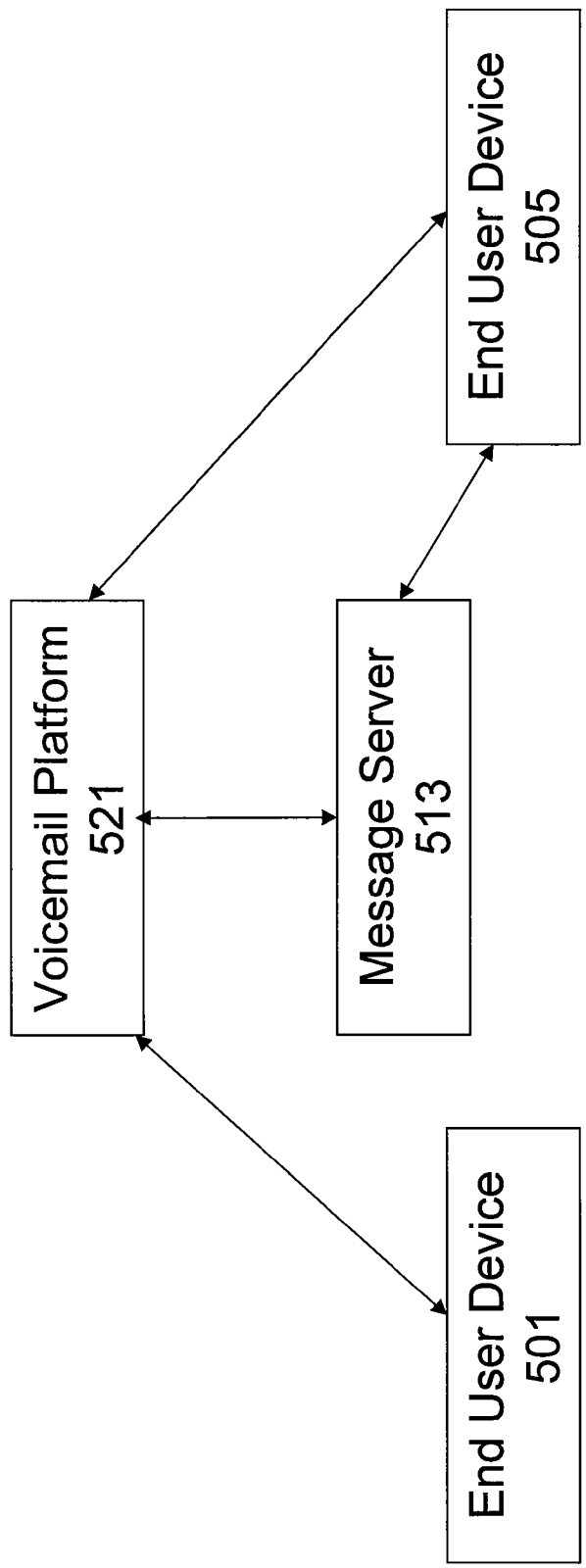
FIG. 5 shows a diagram of end user devices with voicemail capability in communication with one another through a message server capable of dynamically converting voicemail data message formats in accordance with another embodiment.

A further exemplary embodiment corresponding to FIG. 5 may be described with regard to voicemail messaging services. If, for example, end user device 505 is configured to use a voice messaging service that is different from traditional voicemail and requires IMS connectivity, the voicemails may be sent and received by end user device 505 using large message mode, which is defined by the Open Mobile Alliance (OMA). In a large message mode, SIP is used to set up a unidirectional message session relay protocol (MSRP) session where a data payload is transferred and the session is then torn down.

When end user device 505 desires to send a voice message, the message is first recorded onto end user device 505 and transferred to a message server 513 as an attached file, using MSRP. Messages sent to end user device 505, are likewise transferred as attached files. These attached files may then be rendered by a media player that resides within end user device 505.

Through a voicemail platform 521, end user device 505 may configure a profile stored at the voicemail platform to dictate that incoming voicemail messages be forwarded to message server 513. Changes to the profile may be made through a user interface, including, but not limited to a telephone or web user interface. Depending on a specific voicemail platform's capabilities, all messages may be forwarded, or forwarding may selective (e.g., only messages from end user device 501 are forwarded).

In this particular example, voicemail platform 521 interacts with message server 513 via simple mail transfer protocol (SMTP) or through a web services interface. To start the example, end user device 501 leaves a voice message for end user device 505, stored at voicemail platform 521. In keeping with the preferences indicated by end user device 505, voicemail platform 521 forwards the voice message to message server 513, including end user device 501's telephone number. Message server 513 transfers the voice message to end user device 505 using large message mode. A "From" address field is populated with a telephone uniform resource identifier (URI) based upon end user device 501's telephone number. Message server 513 also adds header field "Originated-As: VoiceMail" to the voicemail.

After end user device 505 accesses or plays the voicemail from end user device 501, end user device 505 may choose to record and send a response to message server 513 either as a voicemail or as a message in a different messaging service format. The response would be addressed to end user device 501's telephone URI. End user device would add header field "OK-To-Convert-To: VoiceMail" to the response. Based on the OK-To-Convert-To header field, message server 513 would have an indication that the response from end user device 505 should be converted to a voicemail. Thus, message server 513 forwards the message to voicemail platform 521, which handles the conversion of the response and eventual transmission to end user device 501.

All of the aforementioned embodiments and examples described above have shown an interaction between two users or end user devices and a message server. However, the embodiments of the present disclosure are not limited to converting data message formats between two users or end user devices. The embodiments may be applied and implemented in any number of communication networks where multiple users are present. For example, if an end user device were to send a message to more than one recipient, the message server may include a header indicating an origin format on all outgoing messages to the desired recipients. Similarly, the recipients may respond with messages including a header indicating that their messages may be converted to the origin format if the original end user device that transmitted the first message is unable to properly receive messages in a format other than the origin format.

Figure 6:
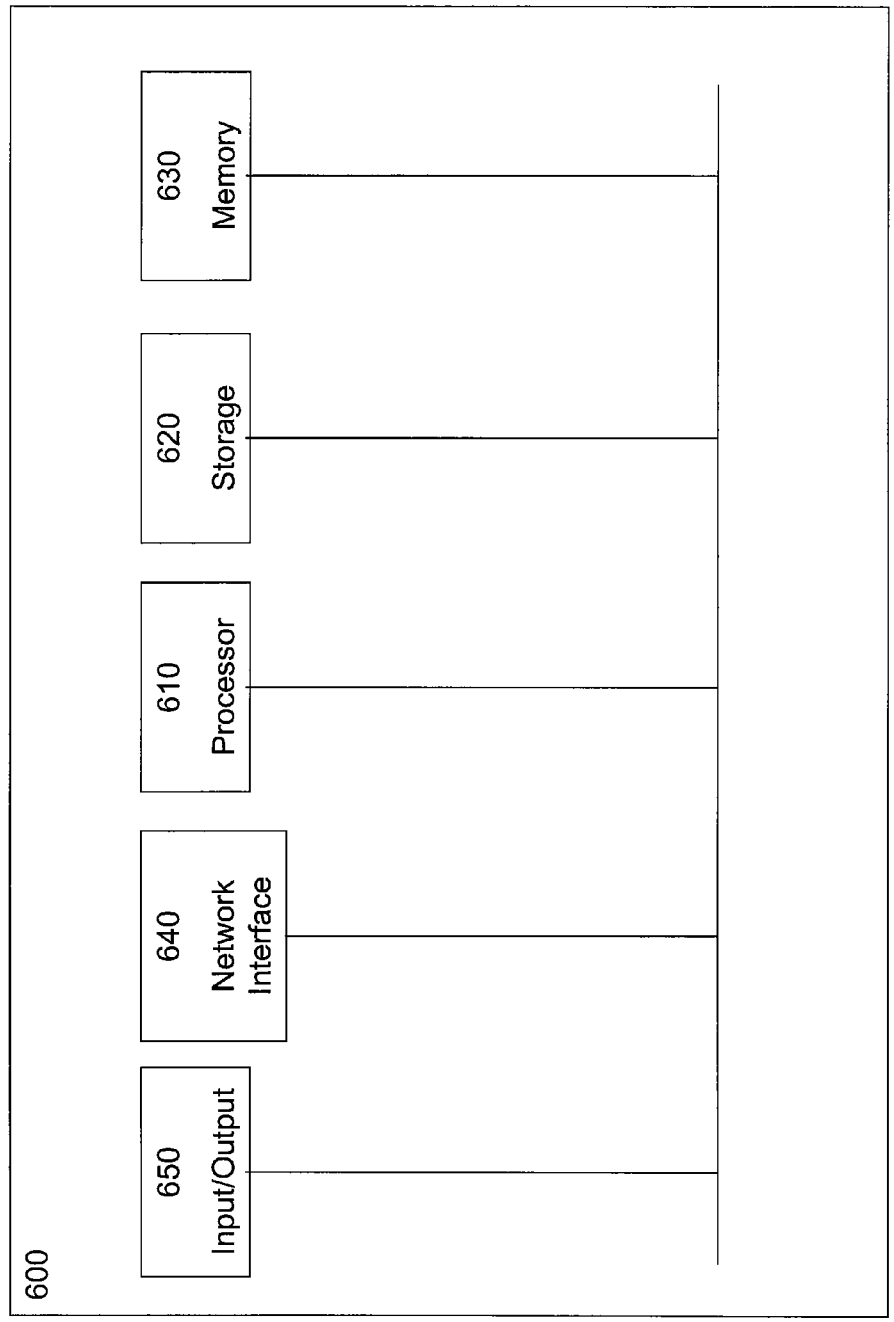
FIG. 6 is a high level block diagram of a computer system which may be used in an embodiment.

The above-described methods for dynamically converting data message formats can be implemented on a computer using well-known computer processors, memory units, storage devices, computer software, and other components. A high-level block diagram of such a computer is illustrated in FIG. 6. Computer 600 contains a processor 610 which controls the overall operation of the computer 600 by executing computer program instructions which define such operations. The computer program instructions may be stored in a storage device 620, or other computer readable medium (e.g., magnetic disk, CD ROM, etc.), and loaded into memory 630 when execution of the computer program instructions is desired. Thus, the method steps of FIG. 2 can be defined by the computer program instructions stored in the memory 630 and/or storage 620 and controlled by the processor 610 executing the computer program instructions. For example, the computer program instructions can be implemented as computer executable code programmed by one skilled in the art to perform an algorithm defined by the method steps of FIG. 2. Accordingly, by executing the computer program instructions, the processor 610 executes an algorithm defined by the method steps of FIG. 2. While the computer 600 has been described as being used for converting data messages by performing an algorithm in accordance with the method steps shown in FIG. 2, computer 600 may also perform other functionalities, such as those described above in connection with FIGS. 3, 4, and 5. The computer 600 also includes one or more network interfaces 640 for communicating with other devices via a network. The computer 600 also includes input/output devices 650 that enable user interaction with the computer 600 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the embodiments disclosed herein is not to be determined from the Detailed Description, but rather from the claims as interpreted according to the full breadth permitted by the patent laws. It is to be understood that the embodiments shown and described herein are only illustrative of the principles of the present embodiments and that various modifications may be implemented by those skilled in the art without departing from the scope and spirit of the embodiments described herein. Those skilled in the art could implement various other feature combinations without departing from the scope and spirit of the embodiments of the present disclosure.

We claim:

1. A method comprising:
   receiving a first data message in a first format originating from a first device and destined for a second device, the first data message comprising an indication whether the first data message is convertible to a second format based on a prior data message received by the first device from the second device;
   determining that the first data message is not convertible to the second format based on the indication;
   determining, in response to the determining that the first data message is not convertible to the second format, that the second device is unable to receive messages in the first format based on use of a network compatible with the first format by the second device for a different operation at a time when an attempt is made to deliver the first data message;
   storing the first data message until the network compatible with the first format is available for sending the first data message to the second device in the first format; and
   transmitting the first data message to the second device upon detecting that the network compatible with the first format is available for sending the first data message to the second device in the first format.

2. The method of claim 1, wherein the first data message is received in response to receiving a second data message in the second format from the second device.

3. The method of claim 2, wherein the second data message is a text message sent by the second device via a short messaging service center.

4. The method of claim 1, wherein the first data message includes a pointer to a map.

5. The method of claim 1, wherein the first data message comprises a multimedia message.

6. The method of claim 1, wherein the prior data message received by the first device from the second device comprises a second indication identifying whether the prior data message is convertible to a different format and wherein the indication of the first data message is based on the second indication.

7. An apparatus comprising:
   a processor; and
   a memory to store computer program instructions, the computer program instructions when executed on the processor cause the processor to perform operations comprising:
      receiving a first data message in a first format originating from a first device and destined for a second device, the first data message comprising an indication whether the first data message is convertible to a second format based on a prior data message received by the first device from the second device;
      determining that the first data message is not convertible to the second format based on the indication;
      determining, in response to the determining that the first data message is not convertible to the second format, that the second device is unable to receive messages in the first format based on use of a network compatible with the first format by the second device for a different operation at a time when an attempt is made to deliver the first data message;

storing the first data message until the network compatible with the first format is available for sending the first data message to the second device in the first format; and transmitting the first data message to the second device upon detecting that the network compatible with the first format is available for sending the first data message to the second device in the first format.

8. The apparatus of claim 7, wherein the first data message is received in response to receiving a second data message in the second format from the second device.

9. The apparatus of claim 8, wherein the second data message is a text message sent by the second device via a short messaging service center.

10. The apparatus of claim 7, wherein the first data message includes a pointer to a map.

11. The apparatus of claim 7, wherein the first data message comprises a multimedia message.

12. The apparatus of claim 7, wherein the first data message comprises a voice message.

13. A computer readable storage device storing computer program instructions, which, when executed on a processor, cause the processor to perform operations comprising:

receiving a first data message in a first format originating from a first device and destined for a second device, the first data message comprising an indication whether the first data message is convertible to a second format based on a prior data message received by the first device from the second device;

determining that the first data message is not convertible to the second format based on the indication;

determining, in response to the determining that the first data message is not convertible to the second format, that the second device is unable to receive messages in the first format based on use of a network compatible with the first format by the second device for a different operation at a time when an attempt is made to deliver the first data message;

storing the first data message until the network compatible with the first format is available for sending the first data message to the second device in the first format; and transmitting the first data message to the second device upon detecting that the network compatible with the first format is available for sending the first data message to the second device in the first format.

14. The computer readable storage device of claim 13, wherein the first data message is received in response to receiving a second data message in the second format from the second device.

15. The computer readable storage device of claim 13, wherein the first data message includes a pointer to a map.

16. The computer readable storage device of claim 13, wherein the first data message comprises a multimedia message.

17. The computer readable storage device of claim 13, wherein the first data message comprises a voice message.

* * * * *